P. A. SAGEN.
SPRING WHEEL.
APPLICATION FILED APR. 23, 1917.
1,287,762.                                         Patented Dec. 17, 1918.
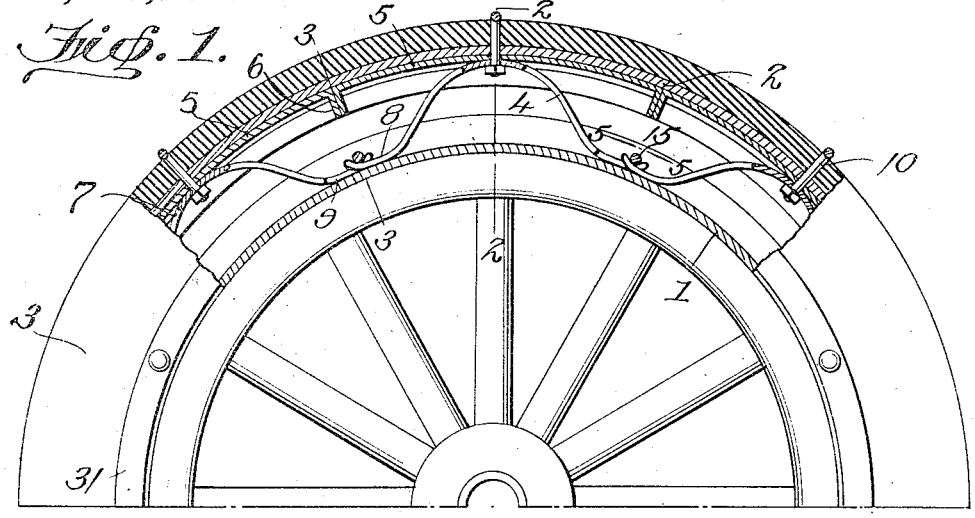
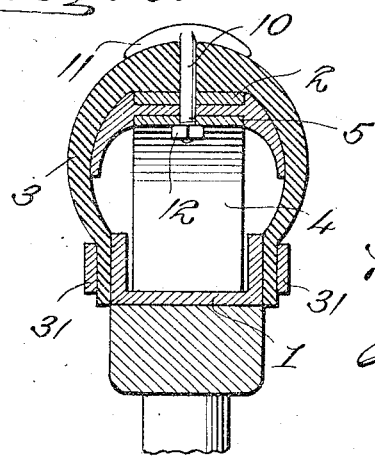
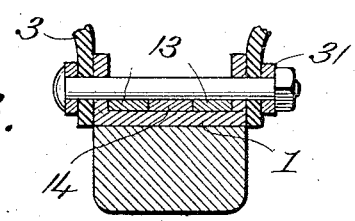
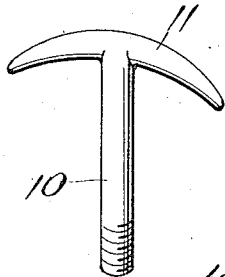
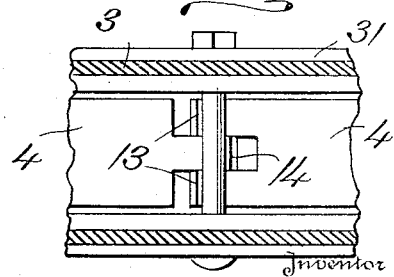
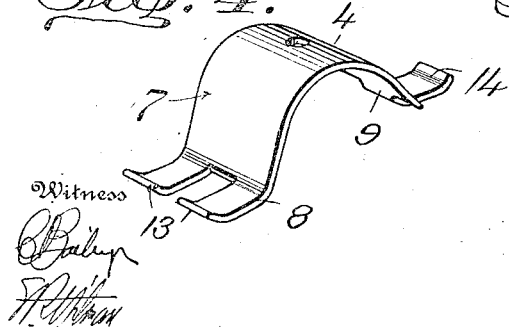

UNITED STATES PATENT OFFICE.

PETER A. SAGEN, OF WAUSAU, WISCONSIN.

SPRING-WHEEL.

1,287,762.   Specification of Letters Patent.   Patented Dec. 17, 1918.

Application filed April 23, 1917. Serial No. 163,902.

*To all whom it may concern:*

Be it known that I, PETER A. SAGEN, a citizen of the United States, residing at Wausau, in the county of Marathon, State of Wisconsin, have invented certain new and useful Improvements in Spring-Wheels; and I do hereby declare the following to be a full, clear, and exact description of the invention, such as will enable others skilled in the art to which it appertains to make and use the same.

This invention relates to resilient wheels.

The object of this invention is to provide an improved form of resilient wheels, which, as hereinafter more particularly described, consists in general of inner and outer rims, a flexible casing inclosing the rims, and spring elements disposed between the rims to take the place of the usual pneumatic expanding medium for the casing.

With the above and other objects in view, and such others as may hereinafter appear, my invention will now be fully set forth and described, reference being had to the accompanying drawings.—

In the drawings:—

Figure 1 is a partial side elevation and partial sectional view of a fragment of a wheel embodying the invention.

Fig. 2 is a section on line 2—2 of Fig. 1,

Fig. 3 is a section on line 3—3 of Fig. 1,

Fig. 4 is a perspective view of one of the spring devices,

Fig. 5 is a section on line 5—5 of Fig. 1, and

Fig. 6 is an elevation of a locking bolt used in my invention.

Referring more particularly to the drawings, 1 represents the inner rim which is supported by a usual hub and spoke structure. Inclosing the rim 1 in spaced relation thereto is an outer rim 2 which is formed of a continuous band of resilient steel, the rims 1 and 2 being held in spaced relation by means of a series of resilient shock absorbing elements. The rims 1 and 2 are inclosed by a flexible casing 3 which is preferably made of rubber and otherwise formed to simulate the appearance of the usual shoe or casing of an automobile tire. The casing 3 is of such a diameter that the rim 2 lies against the inner face of the peripheral portion of the casing, while the marginal edges of the casing 3 are secured to the edges of the inner rim 1, as by the rings 31.

Interposed between the rim 2 and the rim 1 are the resilient units which are formed by the shaped leaf springs 4 and the shoes 5. The shoes 5 consist of trough like plates having an arcuate cross section which corresponds to the curvature of the inner face of the casing 3, and are closed at their ends by the segmental plates 6. The springs 4 are formed of leaf spring metal into arcuate portions 7 and the feet 8 and 9. The arcuate portions 7 bear within the trough like plates or shoes 5, and the feet 8 and 9 ride upon the periphery of the rim 1, the engagement of the feet 8 and 9 with the rim 1 being a slidable one, so that the springs 4 may absorb the shock and jar of travel, which is transmitted from the outer rim. Each of the shoes 5 corresponds with one of the springs 4, and is united therewith by means of a bolt 10, Fig. 6, said bolt passing through the arcuate portion 7 and the middle of the shoe 5. Each of the bolts 10 is provided with a transverse crescent shaped head 11, and in the assemblage of the wheel, the bolts are passed through the casing 3, the shoes 5, and springs 4, the inner ends of the bolts being provided with the nuts 12 for tightening the heads of the bolts in position by means of which the assemblage is drawn in secure relation. The heads 11, extend transversely of the casing 3, in snug relation thereto, and constitute antiskidding elements for the wheel.

The feet 8 and 9 of the springs 4 are of different character, the feet 8 comprising a pair of spaced toes 13 between which the single toes 14 of the feet 9 of the adjacent springs 4 may ride the feet 8 and 9 of the alined springs being thus permitted to overlap without interfering with their independence of operation. Passing transversely through the flanges of the inner rim 1 are the bolts 15 which are so spaced that one appears above each set of the overlapping feet 8 and 9 of the springs 4, the latter being thereby secured to the rim 1. The bolts are so spaced from the periphery of the rim that slideways are formed for the feet 8 and 9, and the extremities of the latter are turned upward to provide heads adapted to strike against the bolts 15 when the contraction of the springs is sufficient to withdraw the feet from under the bolts to the limit of their length.

When the wheel is assembled with the springs 4 secured with their feet engaged below the bolts 15, and the shoes 5 are alined end to end within the rim 2, a continuously resilient structure is formed wherein the spring units take the place of the usual filler of the casing. As the wheel progresses over the surface, the pressure is communicated successively to the shoes and springs, the latter receiving the shocks communicated from the outer rim and absorbing them in expanding against the inner rim.

From the foregoing description it will be apparent that I have provided a simple and compactly constructed spring wheel which can be made to simulate to an almost identical degree the appearance of a wheel provided with a pneumatic tire. The flexible rubber casing 3 is expanded by means of the continuous succession of spring units, and the tread surface of the casing is properly reinforced by the series of shoes.

A combination of a resilient steel band constituting an outer rim with the casing 3 permits the independent tension or distortion of the lower side of the wheel without the necessity of a relative compensation by an operation of the inner and outer rims on the opposite sides of the wheel.

It is noted that distortion of the outer rim due to load strain would be distributed throughout the major portion of the lower side of the wheel, thus the correlative movement of adjacent shoes radially of the wheel would be very slight, and the consequent correlative movement of the end walls 6 of the shoes would be almost infinitesimal, so that the end walls of the shoes may be positioned nearly in abutting contact, without adversely affecting the desired yielding of the outer rim 2.

What I claim as my invention is:—

1. In a spring wheel the combination with an inner rim, of an outer rim consisting of a flexible steel band, a casing inclosing the outer rim and secured to the inner rim, a plurality of shoes forming a continuous succession around the inside of the casing and secured to the outer rim, spring elements secured to the shoes and bearing upon the inner rim, and sliding connections between the inner rim and the springs, said shoes providing guides for the bodies of the spring elements.

2. In a spring wheel, the combination with an inner rim, of an outer rim consisting of a flexible steel band, a casing inclosing the outer rim and secured to the inner rim, spring elements bearing upon the inner rim, a plurality of shoes forming a continuous succession around the inside of the casing, each shoe forming a guide for one of the spring elements, the inner rim and the springs having sliding connections, and bolts passed through the casing, the outer rim, the shoes, and the corresponding springs and securing all of the elements together.

3. In a spring wheel, the combination with an inner rim, of an outer rim consisting of a flexible steel band, a casing inclosing the outer rim and secured to the inner rim, spring elements bearing upon the inner rim, a plurality of shoes forming a continuous succession around the inside of the casing and seating against the outer rim, said spring elements having sliding connections with the inner rim and said shoes forming guides for the bodies of the spring elements, bolts passed through the casing, the outer rim, the shoes, and the corresponding springs to secure all of the parts together, and said bolts having transverse cross heads which seat snugly against the outer surface of the casing.

In testimony whereof, I affix my signature in the presence of two witnesses.

PETER A. SAGEN.

Witnesses:
W. E. HUDTLOFF,
A. O. PLANTZ.

Copies of this patent may be obtained for five cents each, by addressing the "Commissioner of Patents, Washington, D. C."